United States Patent [19]

Kurtz

[11] Patent Number: 4,899,125

[45] Date of Patent: Feb. 6, 1990

[54] CANTILEVER BEAM TRANSDUCERS AND METHODS OF FABRICATION

[75] Inventor: Anthony D. Kurtz, Teaneck, N.J.

[73] Assignee: Kulite Semiconductor Products, Inc., Leonia, N.J.

[21] Appl. No.: 82,407

[22] Filed: Jul. 24, 1987

[51] Int. Cl.$^4$ ............................................. G01L 1/22
[52] U.S. Cl. ........................................... 338/2; 338/3
[58] Field of Search ....................................... 338/2–5; 73/862.5

[56] References Cited

U.S. PATENT DOCUMENTS

| | | | |
|---|---|---|---|
| 3,602,866 | 8/1971 | Saxl | 338/5 |
| 4,424,717 | 1/1984 | White | 338/5 X |
| 4,432,247 | 2/1984 | Takeno et al. | 338/2 X |
| 4,716,774 | 1/1988 | Bull et al. | 338/5 X |

Primary Examiner—Clifford C. Shaw
Assistant Examiner—M. M. Lateef
Attorney, Agent, or Firm—Arthur L. Plevy

[57] ABSTRACT

A cantilever beam transducer which is formed by a batch technique utilizing conventional semiconductor processes. The cantilever beam structure has a central aperture which is rectangular in configuration and which is bounded by thinned rib or thinned area sections on either side of the aperture. Each of these areas accommodate a piezoresistive bridge structure which may include a longitudinal and transverse piezoresistive sensor both of which are located on the same surface of the beam within the thinned areas. The resultant cantilever structure has minimum cross-axis sensitivity while the thin ribbed areas enable it to be deflected in directions perpendicular to the main beam surfaces. The cantilever structure further includes top and bottom glass sheets which are anodically bonded to the cantilever structure and which serve as bidirectional stops to prevent excessive forces from damaging the beam.

21 Claims, 2 Drawing Sheets 4,899,125

CANTILEVER BEAM TRANSDUCERS AND METHODS OF FABRICATION

BACKGROUND OF THE INVENTION

This invention relates to cantilever beam transducers in general and more particularly to an improved cantilever beam transducer employing an aperture on the surface and methods of fabricating such a transducer.

The prior art is replete with a number of transducer configurations which essentially are beam type transducers and as such employ an extended cantilever beam which is supported at one end and is free to deflect at the other end. The beam has deposited or otherwise secured to the surface thereof a plurality of sensors as for example piezoresistive elements. These sensors respond to a force applied to the free end of the beam to provide a resistance proportional to the applied force or pressure.

As indicated, there are many examples of such transducers which appear in the prior art. Reference is made to U.S. Pat. No. 3,654,579 issued on Apr. 4, 1972 to A.D. Kurtz et al and entitled ELECTROMECHANICAL TRANSDUCERS AND HOUSINGS. This patent is assigned to Kulite Semiconductor Products, Inc., the assignee herein. The patent shows an example of a particular type of beam transducer.

Reference is also made to U.S. Pat. No. 3,970,982 entitled BEAM-TYPE TRANSDUCERS EMPLOYING ACCURATE INTEGRAL FORCE LIMITING which issued on July 20, 1976 and is assigned to the assignee herein. In that patent there is a detailed description of the problem one experiences in controlling excessive forces applied to such beam transducers.

Reference is also made to U.S. No. 4,501,451 entitled BEAMTYPE TRANSDUCERS EMPLOYING DUAL DIRECTION FORCE LIMITING MEANS which issued on Sept. 27, 1977 to A.D. Kurtz et al and assigned to the assignee herein. This patent shows other examples of beam-type transducers which are employed in the prior art.

See also U.S. No. 3,993,150 which issued on Nov. 23, 1976 entitled ECONOMICAL WEIGHING APPARATUS EMPLOYING A CANTILEVER BEAM STRUCTURE which patent is also assigned to the assignee herein. Other patents such as U.S. No. 4,327,359 which issued on Apr. 27, 1982 and is entitled GLASS BREAKAGE DETECTORS EMPLOYING PIEZORESISTIVE DEVICES by A.D. Kurtz and assigned to the assignee herein shows particular uses for beam- or cantilever-type transducers while describing other types of such transducers.

There are also a number of cantilever devices which are fabricated from silicon wafers and have elements built in to separate the mass section from the clamping section. The hinges may constitute slots to form a silicon beam of a paddle-like configuration. Such devices have been described at conferences by the University of Stanford, Calif.

As one can ascertain, cantilever- or beam-type transducers are widely employed and used for many different purposes as for measuring force or pressure applied to a beam or other device and have been widely utilized in the prior art. Suffice it to say that it would be extremely desirable to produce a cantilever beam transducer which operates in an efficient manner to detect relatively small forces applied thereto and which transducer exhibits many desirable features such as force limiting in dual directions.

It is a further object to provide a method for fabricating cantilever transducers in large quantities. The method to be described lends itself to the production of accurate and efficient transducers employing cantilever structures which can be batched or mass produced according to the techniques to be described.

BRIEF DESCRIPTION OF THE PREFERRED EMBODIMENT

In a cantilever beam transducer of the type employing a deflectable beam secured at one end to permit deflection at an unsecured opposite end, said beam being a relatively planar rectangular member, the combination therewith comprising a rectangular aperture located on the surface of said beam with said aperture forming thinned beam sections on either side of said aperture and piezoresistive bridge arrays mounted on said beam within said thinned sections.

DETAILED DESCRIPTION OF THE FIGURES

Figure 1:
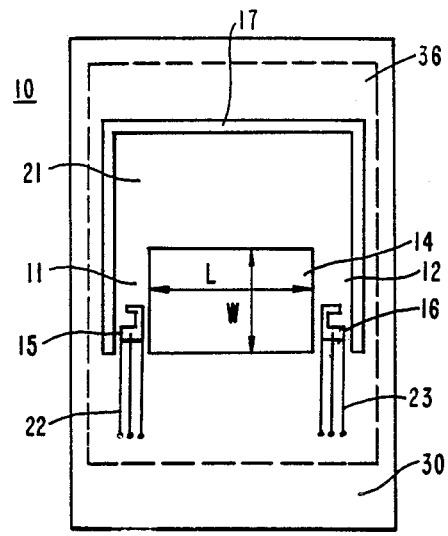
FIG. 1 is a top plan view of a cantilever beam structure according to this invention.

The semiconductor beam 10 as shown in FIG. is essentially rectangular in configuration and has an elongated aperture 14 which is rectangular in configuration and is centrally disposed upon the top surface of the beam. The aperture 14 and a U-shaped channel 17 serve to divide the beam into two thin rib sections 11 and 12 upon which are disposed a bridge array as 15 and 16 each including a longitudinal and transverse piezoresistive sensor arrangement. The U-shaped outer channel 17 serves to define the widths of the rib sections 11 and 12 while defining a mass area 21 for the beam 20. The U-shaped channel 17 serves to separate the wafer into a top clamping area 36 and a deflectable mass area 21. The area 21 as seen is capable of deflecting even though areas 36 and 30 are clamped or otherwise restrained.

Contact points from the piezoresistive sensor arrangements as 15 and 66 are directed to contact areas as 22 and 23 to enable one to arrange or wire the piezoresistive configurations into a suitable bridge. As one can ascertain from FIG. 1, the beam essentially has two thin rod or rib connecting sections 11 and 12 upon which are disposed the piezoresistive sensor arrangements as 15 and 16. One of the piezoresistive elements in each rib section is arranged to be responsive to longitudinal stress and the other sensor is arranged to be responsive to transverse stress. The formation of transverse and longitudinal responding sensors employing piezoresistive elements is well known in the art.

As will be further explained, the gages or sensors which comprise the respective arrays 15 and 16 are provided on the top surface of the beam in the thin ribbed areas 11 and 12 by means of a single diffusion process. FIG. 2 as indicated above shows a sectional view of the beam of FIG. 1, to more clearly depict the structure of the rib areas as well as the aperture 14 and channel 17.

Referring to FIG. 2, the semiconductor cantilever beam 10 essentially is fabricated from a silicon wafer and has sections 30 and 36 which are utilized as clamping areas. The central portion or the portion where the aperture 14 exists, designated in FIG. 2 as 31, is relatively thin as compared to sections 21, 30 and 36. The area 31 is the rib areas 11 and 12, and as will be explained, the aperture 14 is formed by a suitable etching technique. The deflectable portion 21 of the beam 10 constitutes a mass for the beam and is approximately of the same thickness as the clamping portion 30. It is, of course, understood that the thickness of areas 30 and 21 can vary accordingly.

Figure 2:
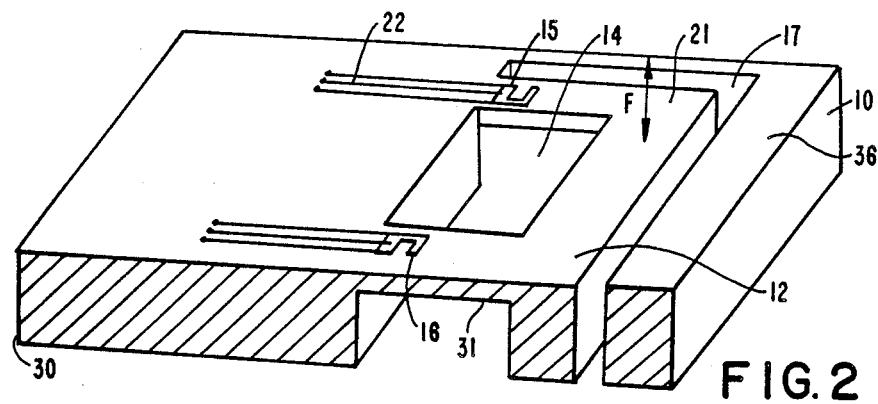
FIG. 2 is a cross sectional plan view of the beam depicted in FIG. 1.
Figure 3:
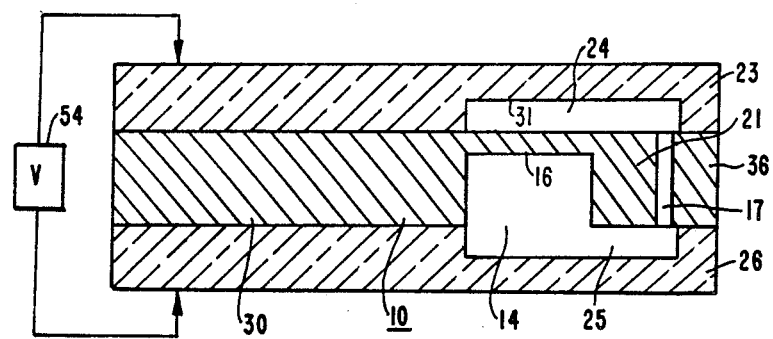
FIG. 3 is a cross sectional view of a cantilever beam transducer according to this invention.

As seen in FIG. 3, there is a top glass cover 23 which is anodically bonded to the top surface of the wafer and a bottom glass cover 26 which is also anodically bonded to the bottom surface of the wafer. The covers 23 and 26 may also be bonded to the top area of the beam 36 with the groove 17 allowing the mass section 21 to deflect. Primarily, the deflection occurs due to the reduced rib sections at location 31. If the force applied is excessive, the bottom surface of the mass member 21 will impinge upon the glass cover 26 which glass cover thus offers a convenient means of stopping the beam from further deflection. In a similar manner upon an excessive force being applied in an opposite direction, the beam 10 will impinge on the bottom surface of the glass cover 23 which also acts as a stop. Hence as seen from FIG. 3, the cantilever beam structure is a semiconductor beam and has dual force limiting which is provided by means of the glass covers 23 and 26 which are electrostatically or anodically bonded to the semiconductor wafer at the bonding or clamping areas 30 and 36 o secured by other means. The cantilever structure as depicted in FIG. 2 can be secured to a housing by means of many well known techniques. Examples of suitable bonding techniques or housings for such cantilever structures are available by reference to the abovenoted patents.

In any event, referring back to FIG. 1, as one can see, the stiffness of the beam in a sideways direction does not substantially change due to the presence of the aperture 14. This is extremely important as a beam should remain stiff to any components of force applied to the thin side surface of the beam. For a force (F) which is applied along the vertical axis as for example shown in FIG. 2, the beam is extremely compliant due to the presence of the thin rib sections 11 and 12 which are provided based on the formation of the central aperture 14 and the surrounding U-shaped channel 17. Hence, the aperture 14 does not significantly change the stiffness of the beam for components or forces directed along the side surfaces. The aperture 14 serves, by means of the thin sections or rib sections, to allow the beam to be extremely compliant for forces applied in the vertical direction or perpendicular to the top surface of the beam. This enables the beam to respond most efficiently to these forces, for example as those forces applied in directions depicted in FIG. 2.

Typical dimensions for such a beam as shown in FIG. 1 may be as follows. It is first noted that the dimensions to be given are merely by way of example but are typical for the processes to be described. Essentially, the beam as shown in FIG. 1 may be approximately 100 mils wide by 200 mils in length and as indicated and shown is a rectangular planar member. The central aperture 14 which is rectangular in configuration may be approximately 30 mils wide (W) by 60 mils long (L). The width of each of the thin ribbed sections 11 and 12 which include and contain the piezoresistive arrays as 15 and 16 are approximately 15 mils wide and 30 mils in length. The clamping section 30 is approximately 75 mils long. As shown in FIG. 2, the thickness of the clamping area 30 may be approximately 10 mils with the thickness of the rib sections being approximately 1 mil with the thickness of section 21 also being approximately 10 mils.

As can be seen from FIG. 3, in order to utilize glass cover sheets as 23 and 26 as stops, the sheets may be etched or further treated at the surfaces facing the beam so that they are essentially thicker at the areas near section 30 to which they are electrostatically bonded or in other ways bonded than they are as directed over the area 21. The glass sheets are treated so that the spaces as 24 and 25 between the end member 21 can be approximately 5 mil at the top and 5 mil at the bottom. It is, of course, understood that one can vary the spacing by merely etching or treating the glass accordingly. The glass sheets are fabricated as box-like covers and are secured to the beam at the four sides.

Again, referring to FIG. 3, there is shown the two glass sheets as 23 and 26 which are electrostatically bonded or otherwise formed to the clamping ends of the semiconductor beam 10 which as will be explained may be fabricated according to the same techniques. In any event, the beam 10 may be treated by etching or other techniques such that the mass portion 21 is of a lesser width than the clamping portion. In this manner the glass sheets can be completely rectangular in cross section and the spacing as spaces 24 and 25 are determined by etching the mass portion such as portion 21 of the semiconductor beam to provide the proper separation for the glass stops. It is also noted that the rib portions 11 and 12 adjacent the aperture 14 can also be reduced on the bottom to provide a further reduction in rib thickness. This capability will be immediately apparent to those skilled in the art upon discussion of the fabrication techniques employed in forming a cantilever beam structure according to that shown in Figs. 1–3.

Figure 5:
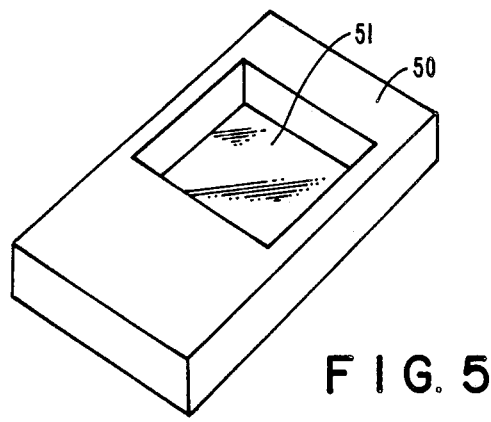
FIG. 5 is a plan view of a typical glass cover sheet used in this invention.

FIG. 5 depicts a typical glass cover member 50 which essentially has an aperture 51. The aperture 51 can be formed by an etching technique to any desired depth and any configuration. Essentially, as seen from FIG. 5, the glass cover sheet as 50 would be analogous to sheets 23 and 26 as shown in FIG. 3. As one can ascertain from FIG. 5, the glass cover sheet 50 is essentially a box-like configuration whereby the peripheral portions of the sheet 50 are anodically bonded to the periphery of the transducer structure as for example shown in FIG. 1. Hence, the glass cover member 50 acts as a cover for the entire top and bottom of the transducer member. It is understood that the cover member 50 can be further treated to include channels or apertures at either end to accommodate the wires or terminals as 22 and 23.

Thus, the entire glass cover member 50 as shown in FIG. 5 can be utilized for the top and bottom covers as 23 and 26 shown in FIG. 3 and is secured to the periphery of the transducer structure as for example the structure shown in FIG. 1 in a manner indicated by the dashed lines. Thus, as one can ascertain the cover member 50 is essentially a top and a bottom cover which consists of glass and which has the particular characteristics as shown in FIG. 5.

Figure 4:
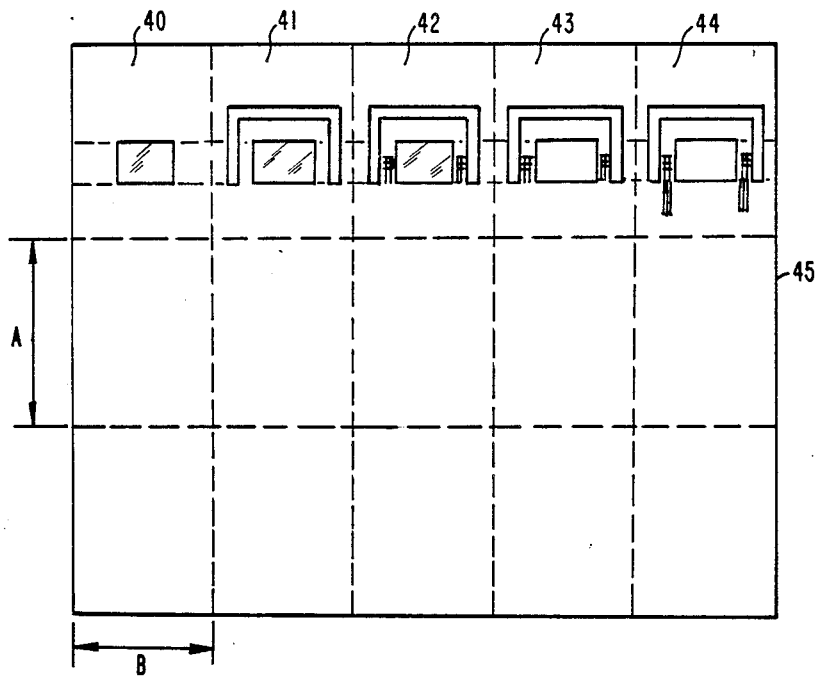
FIG. 4 is a top plan view of a semiconductor wafer which is to be processed to form a plurality of beams according to this invention.

Referring to FIG. 4, there is shown a semiconductor wafer 45. Essentially, the semiconductor wafer 45 may be a silicon wafer which is conventional and can be purchased in various sizes. For purposes of this example, the wafer may be 1 inch by 1 inch or any other convenient size. FIG. 4 depicts a series of dashed lines which indicate a plurality of transducer structures which are all fabricated by the described processes. Hence, the wafer 45 which is large is capable of accommodating a plurality of transducers which are fabricated simultaneously within each of the dashed rectangular areas as depicted in FIG. 4. The processing techniques utilize conventional integrated circuit technology such as photolithographic masking techniques, etching techniques and diffusion techniques as will be subsequently explained.

As indicated, the dimension A which is essentially the length of each beam is approximately 200 mils while the width of each beam is approximately 100 mils. It is noted that the actual dashed line configurations depicted in FIG. 4 are not truly indicative of the number of beams that can be accommodated but the above-noted dimensions will clearly indicate how many beams can be produced by the processes to be described.

Essentially, the wafer 45 can be of any convenient width and any convenient length. For example, if each of the beams are 100 mils wide and 200 mils long by employing a 1 inch square wafer 45, 25 beams can be provided. In any event, a 1 inch by 1 inch wafer can be employed or any other size can be accommodated by using this technique. It is therefore indicated at the onset that an objective of this method is to produce a plurality of cantilever beam structures as that shown in FIGS. 1–3 by simultaneous processing of a large wafer 45.

The wafer 45 may be approximately 10 mils in thickness to accommodate the above-described thicknesses for the clamping end 30 and the deflectable member 21. In any event, any other thickness may be employed and the actual thickness of the entire wafer can be reduced by conventional semiconductor techniques such as etching, polishing and so on.

The first step in the process is depicted by reference numeral 40. In this step, the entire wafer is masked so that the central apertures (as 14 of FIG. 1) are defined in the first step. The step 40 utilizes photolithographic masks to define the apertures as 14 within each of the dashed lines. The etch is performed such that a partial aperture having the configuration of aperture 14 is etched into the top surface of wafer 45 within each dashed area. The etch is accommodated so that one etches at a greater depth than the actual ribs. For example, as shown in FIG. 2, the width of each rib section is approximately 1 mil. Thus, one would accommodate an etching as a first step in the wafer 45 of 1 ½ mils. As one can ascertain, if the wafer is 10 mils thick then there remains 8 ½ mils underneath the partial apertures which is accommodated by the first etching step as indicated in 40. The partial apertures in each of the dashed regions would then have an effective depth of 1.5 mils with a width of 30 mils and a length of 60 mils as given in the above-noted example thus defining rib widths on either side of the aperture of 15 mils for example. After completing the etching of the partial aperture at the desired depth, the next step in the process is depicted by reference numeral 41. In this step the U-channel is etched to separate the beam into a mass portion and clamping portions. The U-shaped channel also assures that the rib sections are properly defined and allows one to easily sever the individual assemblies by cutting or etching on the dashed lines. In step 42 one now provides a mask which enables one to diffuse the silicon piezoresistive arrays as 15 and 16 of FIG. 1 within each of the rib areas. Essentially, the diffusion takes place as a single diffusion whereby all of the bridge configurations located within the narrow rib areas are accommodated at the same time by a suitable diffusion mask and hence the structure thus available after the second step in the process is shown in the area designated by reference numeral 42. The diffusion of silicon bridges is well known in the art, and the above-noted patents as well as many other references can be referred to in order to accommodate the diffusion techniques.

Reference numeral 43 depicts a partial explanation of the next step in the process. Essentially, after forming the piezoresistive bridges in the rib sections, one now inverts the chip and proceeds to etch by means of a suitable mask the bottom surface of the chip to define the ribbed area and to form a complete aperture. The etch is implemented with a mask employed on the bottom surface of the chip 45 to essentially reduce the thickness of the beams at that area. As indicated above, the original partial depression was etched to a depth of 1.5 mils. As explained, the actual width of each of the ribbed sections as for example shown in FIG. 2 as 31 is 1 mil. Hence, one now selectively etches so that the etch proceeds to remove 9 mils of material along the length of the aperture.

The etching of the partial aperture as well as the bottom etching is accommodated by an anisotropic etching technique. Such etching techniques are also well known in the art and many examples of suitable etchants as well as etching techniques are given in the prior art references as cited above. As one can understand from the above-described step, the etching of the bottom surface continues to a depth for example of 9 mils. In this manner, upon completion of the etching step 43, the aperture which was a partial aperture is now a full aperture and having piezoresistive bridges located within the thin ribbed sections. The next step in the process is generally depicted by reference numeral 44 of FIG. 4. After the aperture as 14 has been etched, contacts are provided to the semiconductor bridge elements which are located in the thin ribbed sections. The contacts are conventionally metallized contacts which terminate in suitable terminal areas as shown for example in FIG. 1. Metallization techniques and techniques for providing terminals as well as leads to semiconductor bridges are also well known in the art and these techniques are conventionally employed.

After formation of the suitable contact areas and terminal areas as depicted in step 44, one now electrostatically bonds a top and a bottom glass sheet to the semiconductor wafers. This step is indicated in FIG. 3. Essentially, the glass covers 23 and 26 are held in position over the entire wafer by means of a suitable clamping device which exerts a particular pressure. When held in contact, the glass covers are then anodically bonded by means of a voltage source 54 which causes a current to flow through the composite structure thus creating an anodic bond. The anodic bond is well known in the art and many of the above-noted references describe such techniques.

The top glass cover 23 can be first sealed to the beam structure at the top surface by means of the anodic bond technique, while the bottom glass cover 26 can then be sealed to the glass structure at the bottom surface using the same anodic bonding technique. As indicated and as shown, the glass sheets can be preformed so that a suitable gap spacing is provided to allow the free end of the beam to deflect a given distance determined by the gaps as 24 and 25. Hence, the glass sheets as 23 and 26 serve as stops. Each glass sheet may further have a suitable aperture located thereon to allow forces to be applied to the beam. The sealing of glass sheets to semiconductor members is well known in the art and many examples of anodic bonding techniques or techniques for sealing glass to silicon or other semiconductor structures have been extensively described in the prior art.

One can, of course, divide the wafer 45 into individual cantilever wafers prior to sealing the silicon beam to the respective glass sheets or one can seal the entire wafer 45 to a treated top and bottom glass sheet and then after sealing can cut or divide the wafer 45 into individual cantilever transducer structures. .Thus, as one can ascertain, the above-described process enables one to produce cantilever structures as for example shown in FIGS. 1–3 by a batch fabrication which essentially enables a manufacturer to produce a large number of highly sensitive transducers by processing a large wafer to produce such individual units. Each of the cantilever beams thus provided exhibits a low cross-axis sensitivity due to the fact that the thin ribbed sections as well as the central aperture do not unduly compromise cross-axis sensitivity. Hence, the beams produced do not significantly respond to cross-axis forces. In any event, the beams are extremely sensitive to vertical or perpendicular forces as indicated above.

The above-described techniques produce a superior cantilever structure which is extremely economical to manufacture and which includes capability of responding to forces along the vertical axis, for example forces applied downwardly or upwardly as shown in FIG. 2. The cantilever structure inherently has the secured glass sheets which provide accurate stop mechanisms to prevent undue forces from breaking or damaging the beam.

As one can ascertain, the techniques described enables one to provide an improved cantilever structure and to provide many such structures by simultaneous processing techniques employed on a large wafer. It is, of course, understood as shown in FIG. 3, that one can also etch the end portions of the beam as each end to enable one to secure uniform cross section glass sheets to the beam for an alternative embodiment. The masks utilized for such etching should be completely understood by those skilled in the art. As one can ascertain, the processes described above are implemented by well known techniques but are provided in the manner to produce the beam structure as shown.

Such a beam structure, as indicated, enables one to achieve improved operation while further enabling one to provide a reliable beam structure which avoids many of the disadvantages of such prior art structures. By employing the top and bottom glass cover sheets one can oil fill the entire unit the narrow gap 17 acting to cause the oil to exhibit shearing effects when the mass portion 21 deflects.

It is also understood that the above-noted dimensions were given by way of example only and one can accommodate many different types of configurations as well as many different types of dimensions utilizing the techniques and structures described above without departing from the spirit and scope of this invention.

What is claimed is:
1. In a cantilever beam transducer of the type employing a deflectable beam secured at one end to permit deflection at an unsecured opposite end, said beam being a relatively planar rectangular member and having a top and a bottom surface, the combination therewith comprising:
a rectangular aperture extending through said beam from said top and said bottom surface with said aperture forming thinned beam sections on either side of said aperture and piezoresistive bridge arrays mounted on said beam upon said thinned sections and located on said top surface of said beam whereby there is an array on each side of said aperture on said top surface.

2. The cantilever transducer according to claim 1, wherein said beam is fabricated from a semiconductor material and said piezoresistive bridge arrays are diffused into said thinned beam sections.

3. The cantilever transducer according to claim 1, wherein said aperture is directed along the major axis of said beam to form a first thinned surface section on one side and a second thinned surface section along an opposite side, each thinned section being relatively of the same width with a U-shaped channel spaced about said aperture with the base of said U extending parallel to a side of said aperture to create a mass portion for said beam.

4. The cantilever beam transducer according to claim 1, wherein each bridge array includes at least one sensor operative in a longitudinal mode and at least a second sensor operative in a transverse mode.

5. The cantilever beam transducer according to claim 2, wherein said aperture is etched into said semiconductor beam.

6. The cantilever beam transducer according to claim 2, wherein said semiconductor material is silicon.

7. The cantilever beam transducer according to claim 6, wherein said aperture is etched into said silicon beam by an anisotropic etch.

8. The cantilever beam transducer according to claim 1, further comprising beam stopping means coupled to said beam surface and operative to limit the deflection of said beam at said opposite end.

9. The cantilever beam transducer according to claim 8, wherein said stopping means includes a glass sheet coupled to said beam at said secured end.

10. A cantilever beam transducer, comprising:
a rectangular planar beam member having a top and a bottom surface fabricated from a semiconductor material and having a rectangular aperture extending through said member from said top to said bottom surface which aperture is positioned to form first and second thin rib sections on each side of said aperture, with said beam having a reduced cross sectional area in said rib sections, with the area of said beam above said rib sections being thicker in cross section compared to the area below said rib sections,
a first piezoresistive array located on said first rib section and on said top surface of said member,
a second piezoresistive array located on said second rib section and on said top surface of said member,
at least one glass sheet secured to said beam about said section above said rib sections and extending along said beam and operative to limit deflection of said beam in a given direction due to an applied force of a given magnitude.

11. The cantilever beam transducer according to claim 10, wherein said first and second bridge arrays each include at least one sensor operative in a longitudinal mode and one sensor operative in a transverse mode.

12. The cantilever beam transducer according to claim 10, further including a second glass sheet secured to said beam on a surface opposite said one glass sheet and extending along said beam and operative to limit the deflection of said beam in an opposite direction for a given force applied in a direction opposite to said given magnitude force.

13. The cantilever beam transducer according to claim 10, wherein said rectangular aperture is of equal width and length and is formed on said semiconductor beam by an anisotropic etch.

14. The cantilever beam transducer according to claim 1, wherein said glass sheet is secured to said beam by an anodic bond.

15. The cantilever beam transducer according to claim 1, wherein said bridge arrays are diffused into said regions.

16. A method of fabricating a cantilever beam transducer said transducer being a planar rectangular member having a top and a bottom surface comprising the steps of:

forming a partial rectangular depression in said top surface of said rectangular planar semiconductor wafer member and symmetrically disposed to define first and second thin rib sections on either side of said depression, forming first and second bridge arrays on said thinned sections on said top surface and located on each side of said depression, etching the bottom surface of said wafer along the width and length of said depression to form a rectangular aperture extending through said top and bottom surfaces to provide a thinner cross sectional area at said rib sections than the cross sectional area above and below said rib sections, forming contact areas for electrical connection to said first and second bridge arrays.

17. The method according to claim 16, including the further steps of:

securing a first glass sheet to said top surface of said member in said area above said rib sections with said sheet directed along the length of said member to act as a stop for first direction forces.

18. The method according to claim 17, including the further step of securing a second glass sheet to said bottom surface of said member to act as a stop for second direction forces.

19. The method according to claim 17, wherein the step of securing includes anodically bonding said glass sheet to said semiconductor member.

20. The method according to claim 16, wherein said semiconductor member is fabricated from a wafer of silicon which wafer is processed according to said steps of claim 16 to form a plurality of cantilever transducers.

21. The apparatus according to claim 1, wherein each bridge array includes a Wheatstone bridge array with at least two resistors in said array being responsive to stress.

* * * * *